US005675078A

United States Patent [19]

Deguara

[11] Patent Number: 5,675,078

[45] Date of Patent: Oct. 7, 1997

[54] ENGINE IGNITION TIMING DEVICE

[76] Inventor: Pierre Deguara, 46 McIntosh Rd., Altona North, Victoria 3025, Australia

[21] Appl. No.: 573,846

[22] Filed: Dec. 18, 1995

[30] Foreign Application Priority Data

Dec. 19, 1994 [AU] Australia .................................. PN0101

[51] Int. Cl.$^6$ .................................................. G01M 15/00

[52] U.S. Cl. .............................. 73/116; 123/418; 340/439

[58] Field of Search .................................... 73/116, 117.2, 73/117.3; 123/350, 370, 371, 418; 340/439

[56] References Cited

U.S. PATENT DOCUMENTS

| | | | |
|---|---|---|---|
| 4,924,830 | 5/1990 | Abe | 73/117.3 |
| 4,989,448 | 2/1991 | Fukui et al. | 73/116 |
| 5,070,727 | 12/1991 | Davis et al. | 73/116 |
| 5,305,220 | 4/1994 | Schoggl | 73/117.3 |
| 5,325,710 | 7/1994 | Morikawa | 73/116 |
| 5,361,630 | 11/1994 | Kowalski | 73/117.3 |
| 5,433,108 | 7/1995 | Sawada | 73/117.3 |

FOREIGN PATENT DOCUMENTS

| | | |
|---|---|---|
| 16387/92 | 11/1992 | Australia . |
| 17387/92 | 12/1992 | Australia . |

*Primary Examiner*—George M. Dombroske
*Attorney, Agent, or Firm*—Lowe, Price, LeBlanc & Becker

[57] ABSTRACT

The present invention relates to a device (1) for providing a reference indication of crankshaft positioning for setting and maintaining ignition timing of spark ignition in, for example, automotive piston engines. The device includes a mounting portion (2) and a carrying portion (7). The mounting portion is adapted for rigid attachment to the crankshaft (S) for rotation therewith, and, in use, extends radially of a rotational axis of the engine crankshaft. The carrying portion is for carrying indicia means (9) by which the positioning of the crankshaft can be determined. Importantly, the device of the invention is adapted to assume the task of indicating spark ignition timing from an harmonic balancer (8).

11 Claims, 1 Drawing Sheet

ENGINE IGNITION TIMING DEVICE

FIELD OF THE INVENTION

The present invention relates generally to ignition timing of spark ignition engines, and more particularly to a device for providing a reference indication of crankshaft positioning for setting and maintaining timing of spark ignition. The device is applicable to automotive spark ignition piston engines and it will be hereinafter described with respect to that exemplary application. It is to be appreciated, however, that this invention is not limited to that particular application.

BACKGROUND OF THE INVENTION

As will be understood by persons skilled in the art of automotive engine design, manufacture and maintenance, an harmonic balancer (also called a vibration damper) is a heavy wheel mounted in rubber, or like resilient material, for absorbing and controlling torsional vibrations transmitted through the engine crankshaft.

The basic construction of a typical harmonic balancer is a heavy outer ring, known as an inertia ring, attached to an inner hub via a friction fit over a rubber ring located between the inertia ring and the hub. The hub is usually keyed to the crankshaft. In some cases the harmonic balancer also incorporates the crankshaft pulley.

In many cases, spark ignition timing marks for automotive piston engines are provided on an harmonic balancer inertia ring. This, however, has the disadvantage that during the life of the engine the harmonic balancer, which is designed to absorb torsional vibration of the crankshaft, experiences slippage in the rubber ring friction fit causing the timing marks on the inertia ring to move out of their proper position and, as a result, no longer provide an accurate reference indication of top dead centre for the no. 1 piston.

BRIEF SUMMARY OF THE INVENTION

It is an object of the present invention to provide a device for marking ignition timing for engines which ordinarily have the spark ignition timing marks located on the harmonic balancer.

It is further an object of the present invention to provide an ignition timing device for attachment to an engine crankshaft which substantially overcomes the problem of inertia ring slippage and consequential inaccuracy of harmonic balancer timing marks.

According to one broad aspect, the present invention provides a device for providing a reference indication of crankshaft positioning for setting and maintaining ignition timing of spark ignition engines. The device includes a mounting portion and a carrying portion. The mounting portion is adapted for rigid attachment to the crankshaft for rotation therewith, and, in use, extends radially of a rotational axis of the engine crankshaft. The carrying portion is for carrying indicia means by which the positioning of the crankshaft can be determined. Importantly, the device of the invention is adapted to assume the task of indicating spark ignition timing from the harmonic balancer.

In at least one preferred embodiment of this invention, the timing device is configured so as to be mountable in face-to-face relation with an harmonic balancer. The timing device, in use, preferably projects radially beyond an outer periphery of the harmonic balancer and may be configured so as to, in use, extend over an outer peripheral edge of the harmonic balancer.

In at least one preferred embodiment of the invention, the timing device is arranged to substantially house the harmonic balancer. The timing device may therefore have a shell-like configuration, such as, for example, the form of a shallow dish, for substantially surrounding the harmonic balancer.

In at least one embodiment of this invention, the mounting portion is formed from plate material and is configured to extend substantially perpendicular to the rotational axis of the crankshaft. In a preferred form, plate material forming the mounting portion is relatively thin. It is also preferred that the plate material is substantially rigid. The plate material is also preferably relatively light-weight. the mounting portion is desirably symmetrical about the rotational axis of the crankshaft and, in one preferred form, is disc-shaped.

In at least one embodiment of this invention, the mounting portion includes holes for effecting rigid attachment of the timing device to the crankshaft by means of bolts. The timing device may be attached to a hub of the crankshaft by bolts passing through the holes and being received in corresponding tappings in the hub.

In at least one embodiment of this invention, the carrying portion, in use, is located radially distal from the rotational axis of the crankshaft. Accordingly, the carrying portion is preferably provided at a periphery of the mounting portion. Preferably, the carrying portion extends around the entire periphery of the mounting portion. Furthermore, the carrying portion is preferably formed integrally with the mounting portion. In one preferred form of the invention, the carrying portion, in use, extends axially of the rotational axis of the crankshaft. Thus, the carrying portion is preferably in the form of a peripheral flange member which extends transverse the plane of the mounting portion. In an alternative embodiment of this invention, the carrying portion, in use, extends radially of the rotational axis of the crankshaft as an extension of the mounting portion.

The indicia means comprise markings provided on the carrying portion. The indicia means may be formed in, or alternatively, cut from the material of the carrying portion. The indicia means may also be in the form of markings which may be adhesively applied to the carrying portion.

By mounting the device of this invention to an engine crankshaft adjacent the harmonic balancer it is able to assume the task of indicating engine timing previously performed by the balancer. The present invention therefore provides a simple and effective means of overcoming the uncertainties and problems associated with inaccurate timing marks on harmonic balancers caused by inertia ring slippage. The device is simple and economical to manufacture and may be easily fitted to existing automotive spark ignition piston engines.

The above and other features, aspects and advantages of the invention will become more readily apparent from the following detailed description of preferred embodiments of this invention with reference to the accompanying drawings.

DETAILED DESCRIPTION OF THE PREFERRED EMBODIMENTS

Figure 1:
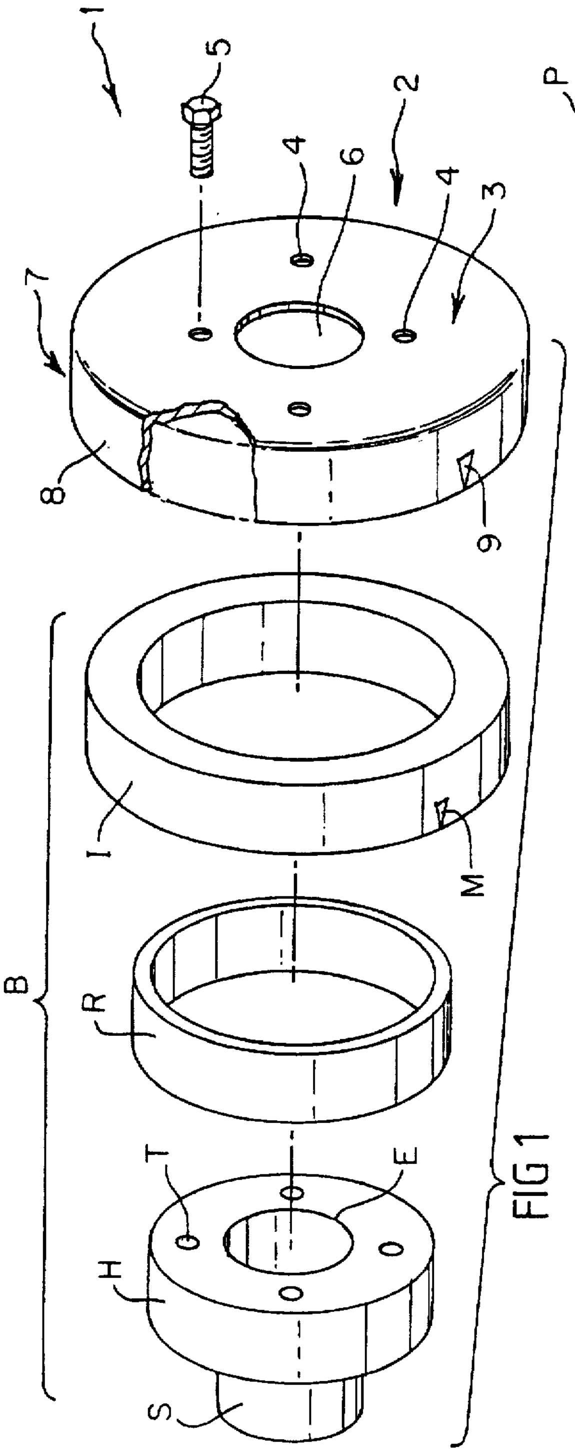
FIG. 1 is an exploded view of a typical harmonic balancer and a timing device according to a preferred embodiment of this invention.

Referring to FIG. 1 of the drawings, the harmonic balancer B includes a relatively massive inertia ring 1 which is friction-fitted onto the hub H of the engine crankshaft S by means of an interference fit over the resilient, elastomeric or rubber ring R disposed between the hub H and the inertia ring 1. The inertia ring typically ears markings M for use in determining engine ignition timing.

Figure 2:
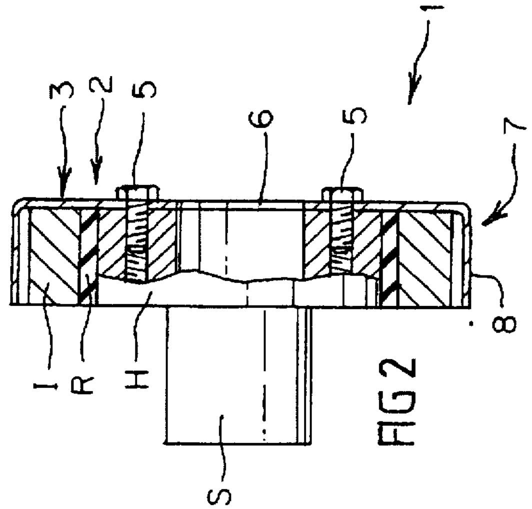
FIG. 2 is a sectional side view of the harmonic balancer and timing device shown in FIG. 1 assembled to an in-use orientation.

With further reference to FIG. 1 and FIG. 2 of the drawings, the timing device 1 includes a mounting portion 2 comprising a disc-shaped member 3 formed from relatively thin, substantially rigid plate material for mounting in face-to-face relationship with the harmonic balancer B. The disc-shaped member 3 of mounting portion 2 is provided with holes 4 for effecting a rigid attachment of the timing device 1 to the crankshaft S by means of bolts 5. The bolts 5 may pass through the holes 4 in the mounting portion to screw into corresponding threaded holes or tappings T in the hub H. The disc-shaped mounting portion 2 may also include a large central opening or hole 6 for location of the timing device 1 around a corresponding raised edge E in a central region of the crankshaft hub H.

The timing device 1 of FIG. 1 and FIG. 2 also includes carrying portion 7 which comprises a flange member 8 extending from a periphery of the disc-shaped member 3 in a direction axially of the rotational axis of the crankshaft S. The flange member 8 of the carrying portion 7 is formed integrally with the mounting portion 2 from the same relatively thin, substantially rigid plate material. The timing device 1 is configured such that the disc-shaped mounting portion 2 projects radially beyond an outer periphery of the harmonic balancer B and the flange member 8 of carrying portion 7 extends over the outer peripheral edge of the harmonic balancer to substantially house the harmonic balancer B in the shell-like or shallow dish configuration of the timing device 1. Indicia means 9 are provided on the flange member 8 of the carrying portion 7. The indicia means 9 comprises marks which may be formed with, or alternatively cut from the material of the flange member 8. The marks of indicia means 9, may as a further alternative, also be adhesively applied to the flange member 8.

As already mentioned, the timing device 1 represented in FIG. 1 and FIG. 2 of the drawings takes the form of a shallow dish. Because the disc-shaped mounting portion 2 extends radially beyond an outer periphery of the harmonic balancer B and the flange member 8 extends over the outer peripheral edge of the inertia ring I, the timing device 1 when mounted in face-to-face relationship with the harmonic balancer substantially houses the harmonic balancer B and the indicia means 9 on flange member 8 of the carrying portion assumes the task of indicating spark ignition timing from the markings M on the harmonic balancer. The rigid attachment of timing device 1 to the crankshaft hub H results in the timing markings (indicia means 8) of the timing device 1 overcoming the problems of slippage of the inertia ring I with respect to the hub H.

Figure 3:
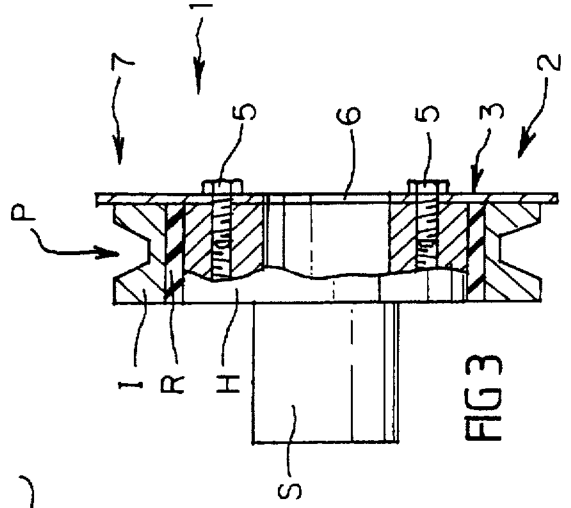
FIG. 3 is a sectional side view of a timing device according to an alternative embodiment of the invention assembled to an in-use orientation with a different type of harmonic balancer, i.e. the harmonic balancer also incorporates a pulley.

FIG. 3 of the drawings illustrates an alternative embodiment of the timing device 1 of the present invention. This particular embodiment is adapted for use with a harmonic balancer in which the inertia ring 1 also incorporates the crankshaft pulley P. Harmonic balancers in this configuration will often include timing marks in the form of one or more notches in the edge of the pulley. In this embodiment of the invention, the carrying portion 7 extends radially of the disc-shaped member 3 of mounting portion 2. Indicia means 9 may be formed in, cut from or adhesively applied to the carrying portion 7 in the same manner as for the embodiment of FIG. 1 and FIG. 2. The mounting portion and means of attachment of the timing device 1 for this embodiment are the same as for the previous embodiment. The device is attachable in face-to-face relationship with the harmonic balancer, but in this instance the device does not extend around the balancer to substantially house it. Nevertheless, the timing device 1 of this embodiment is still adapted to assume the task of indicating spark ignition timing from the harmonic balancer.

The timing devices disclosed herein are preferably fabricated from aluminium which may be pressed and/or cut to the required configuration.

Finally, it is to be understood that various alternations, modifications and/or additions may be introduced into the constructions and arrangements of parts previously described herein without departing from the spirit or ambit of the invention as defined in the claims appended hereto.

I claim:

1. A device for providing a reference indication of crankshaft positioning for setting and maintaining ignition timing of spark ignition engines, said device being mountable in face-to-face relation with an harmonic balancer, and comprising:

a mounting portion formed from plate material and adapted for rigid attachment to the crankshaft for rotation therewith, said mounting portion being substantially symmetrical about a rotational axis of the crankshaft and in use extending radially of the rotational axis beyond an outer periphery of the harmonic balancer; and a carrying portion for carrying indicia means by which the positioning of the crankshaft can be determined, said carrying portion provided at a periphery of the mounting portion and formed integrally therewith, said carrying portion comprising a flange member which extends substantially transverse a plane of the mounting portion thereby creating a shell-like configuration such that the device may, in use, substantially surround or house the harmonic balancer;

wherein the device is adapted to assume the task of indicating spark ignition timing from the harmonic balancer.

2. A device as claimed in claim 1, wherein said indicia means comprises markings formed in said flange member.

3. A device as claimed in claim 1 wherein said indicia means comprises regions where material has been removed from said flange member.

4. A device as claimed in claim 1 wherein said indicia means comprises markings which may be adhesively applied to said flange member.

5. A device as claimed in claim 1 wherein said mounting portion includes a substantially disc-shaped member.

6. A device as claimed in claim 5 wherein said disc-shaped member of the mounting portion includes at least one hole for rigidly attaching the device to the crankshaft by at least one bolt.

7. A device as claimed in claim 6 wherein the disc-shaped member of said mounting portion includes an opening formed in a central region thereof for location about a projecting edge on a hub of the crankshaft.

8. A device for providing a reference indication of crankshaft positioning for setting and maintaining ignition timing of spark ignition engines, comprising:

a mounting portion adapted for rigid attachment to a crank-shaft for rotation therewith, said mounting portion comprising a disc-shaped member formed from relatively rigid plate material having a plurality of holes therethrough for bolted attachment to said crankshaft, said mounting portion in use extending radially of a rotational axis of said crankshaft symmetrically about said axis; and a carrying portion for carrying indicia means by which the positioning of the crankshaft can be determined, said carrying portion comprising a flange member formed integrally with and extending around a periphery of the mounting portion substantially transverse the plane of the disc member thereby giving said device a shell-like or shallow dish configuration;

wherein the device is adapted to be mounted adjacent to an harmonic balancer such that, in use, it substantially surrounds or houses the harmonic balancer to assume the task of indicating spark ignition timing from the harmonic balancer.

9. A device as claimed in claim 8 wherein said disc-shaped member of the mounting portion includes an opening formed in a central region thereof for location about a projecting edge on a hub of the crankshaft.

10. A device as claimed in claim 9 wherein said device is formed from relatively thin aluminum plate material.

11. An harmonic balancer assembly for mounting on an engine crankshaft comprising:

a hub for rigid attachment to said crankshaft for rotation therewith;

an harmonic balancer inertia ring mounted on said hub in a resilient material such as rubber for vibration relative to the hub; and a device for providing a reference indication of crankshaft positioning for setting and maintaining ignition timing of the engine, said device comprising:

a mounting portion adapted for rigid attachment to said hub for rotation therewith, said mounting portion comprising a disc-shaped member formed from relatively rigid plate material having a plurality of holes therethrough for bolted attachment to said hub, the mounting portion extending radially of a rotational axis of said hub symmetrically about said axis; and a carrying portion for carrying indicia means by which the positioning of the crankshaft can be determined, said carrying portion comprising a flange member formed integrally with and extending around a periphery of the mounting portion substantially transverse the plane of the disc member thereby giving said device a shell-like or shallow dish configuration;

wherein the device is mounted adjacent to said harmonic balancer inertia ring such that it substantially surrounds or houses the inertia ring to assume the task of indicating spark ignition timing.

* * * * *